R. SIMPSON.

Assignor, by mesne assignments, to the HIGHLAND FOUNDRY Co.

Stove.

No. 8,137. Reissued March 26, 1878.

WITNESSES
George H. Walker
A. J. Oettinger

Robert Simpson INVENTOR
by his attys
Clarke & Raymond

N. PETERS, PHOTO-LITHOGRAPHER, WASHINGTON, D. C.

UNITED STATES PATENT OFFICE.

ROBERT SIMPSON, OF BOSTON, MASS., ASSIGNOR, BY MESNE ASSIGNMENTS, TO THE HIGHLAND FOUNDRY COMPANY, OF SAME PLACE.

IMPROVEMENT IN STOVES.

Specification forming part of Letters Patent No. 192,088, dated June 19, 1877; Reissue No. 8,137, dated March 26, 1878; application filed March 16, 1878.

*To all whom it may concern:*

Be it known that I, ROBERT SIMPSON, of Boston, in the county of Suffolk and State of Massachusetts, have invented an Improvement in Stoves, of which the following is a specification:

This invention consists in an attachment to a stove of a cloth or towel drying support, having a movement to and from the body of the stove, suitably attached thereto, and arranged at any desirable height above the floor. It is designed, by its adjustment or movement in relation to the stove, to furnish, at a distance sufficiently remote from the stove to prevent burning, a rest upon which towels or other like articles may be hung for drying, and when not in use it is returned to a position close to the body of the stove, and, preferably, under the ledge formed by the projection of the top plate, where it is out of the way.

Figure 1:
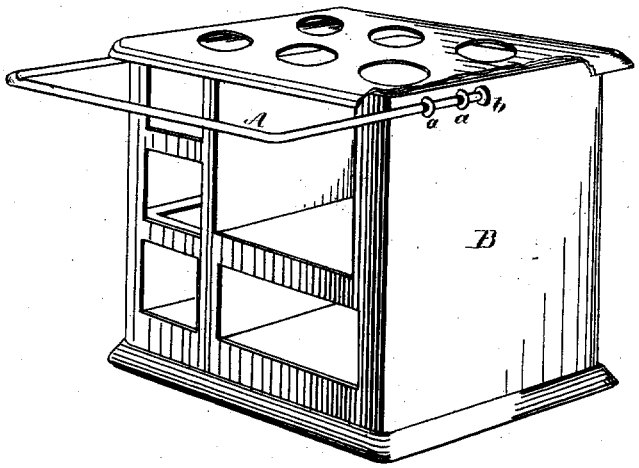
Figure 2:
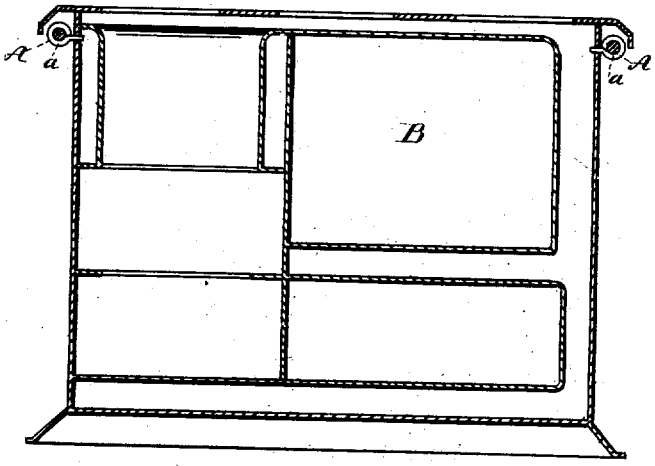

Figure 1 is a perspective of a stove, showing a rest or support thrown out from the stove, with the edge of the top plate broken off to show one method of fastening the rest to the stove; and Fig. 2 is a vertical section thereof.

I show, as one method of practicing my invention, a support or rest, A, consisting of a metal bar, having its ends bent at right angles to the central portion and parallel with each other, for the purpose of being secured to the stove B by the ears or rings *a a* on each side thereof. The ends of the rod are provided with collars *b*, or otherwise enlarged, to act as stops in preventing the support or rest from being detached when drawn from the stove.

Of course other means may be employed in fastening or securing the end or ends of the support or rest to the stove to give it a suitable movement in relation thereto, and it is not necessary that the support or rest be given a lateral movement in relation to the body of the stove, or to support it at both ends, as the principal object of my invention is to provide a stove with a cloth and towel drying support movable or adjustable in relation to the same, and attached thereto. I prefer that the support or rest shall be so fastened or secured to the stove that when not in use it may be shut against the same to be out of the way, and for this purpose I show the rest in Fig. 2 closed against the side of the stove under the ledge or projecting portion of the top plate. Of course it may be shut under or into or against any other portion of the stove to secure this end without departing from the spirit of my invention.

I am aware that towel-bars have been combined with stoves by Mrs. M. E. Capers in her patent of August 10, 1869; but these were not adjustable to and from the body of the stove, nor were they adapted to be shut under a projection from the body of the stove, but were bracketed out, and held in fixed relation with and above the plane of the body of the stove; and I am also aware that C. D. Newton, in his patent of November 23, 1869, showed a removable bar holding fixed relations with the body of a range, but having none of the properties hereinafter claimed as the essence of this invention.

I claim as my invention and desire to secure by Letters Patent of the United States—

1. The combination, with a stove, of a laterally-movable cloth and towel drying support, adjustable to and from the body of the stove, substantially as described.

2. The combination, with a stove, of a laterally-movable cloth and towel drying support, adapted to be shut under a projecting portion of the stove, substantially as described.

ROBERT SIMPSON.

Witnesses:
JAS. H. WENTWORTH,
F. F. RAYMOND, 2d.